United States Patent
Kashiwagi (10) Patent No.: US 12,554,003 B2
(45) Date of Patent: Feb. 17, 2026

(54) RADAR DEVICE, VEHICLE, AND DISTANCE MEASUREMENT METHOD

(71) Applicant: Murata Manufacturing Co., Ltd., Nagaokakyo (JP)

(72) Inventor: Katsuhisa Kashiwagi, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 592 days.

(21) Appl. No.: 17/954,351

(22) Filed: Sep. 28, 2022

(65) Prior Publication Data

US 2023/0032399 A1   Feb. 2, 2023

Related U.S. Application Data

(63) Continuation of application No. PCT/JP2021/014750, filed on Apr. 7, 2021.

(30) Foreign Application Priority Data

Apr. 17, 2020  (JP) .................... 2020-074395

(51) Int. Cl.
  *G01S 13/42*   (2006.01)
  *G01S 13/931*  (2020.01)
(52) U.S. Cl.
  CPC ............ *G01S 13/42* (2013.01); *G01S 13/931* (2013.01)
(58) Field of Classification Search
  CPC .............................. G01S 13/41; G01S 13/931
  See application file for complete search history.

(56) References Cited

U.S. PATENT DOCUMENTS 9,143,194 B2 *  9/2015  Eldar ..................... H03H 17/06
10,838,061 B1 * 11/2020  Crouch ................... G01S 17/36
(Continued)

FOREIGN PATENT DOCUMENTS

JP  2003-167048 A  6/2003
JP  2011-232053 A  11/2011
(Continued)

OTHER PUBLICATIONS

H. Rohling and M. Kronauge, "New radar waveform based on a chirp sequence," 2014 International Radar Conference, Lille, France, 2014, pp. 1-4, doi: 10.1109/RADAR.2014.7060246. (Year: 2014).*
(Continued)

*Primary Examiner* — Marcus E Windrich
(74) *Attorney, Agent, or Firm* — XSENSUS LLP (57) ABSTRACT

A radar device includes a transmitter that generates, as a transmission wave, an electromagnetic-wave beam including a first chirp signal and a second chirp signal, the first chirp signal being a chirp signal whose frequency changes from a first frequency with time, and the second chirp signal being a chirp signal whose frequency changes, with time, from a second frequency different from the first frequency An antenna transmits the transmission wave and receives a reflected wave obtained by reflecting the transmission wave from a target. Circuitry is configured to estimate a first distance, which is a distance to the target, based on a signal related to the reflected wave, estimate a phase difference for the first distance, and estimate a second distance, which is a distance to the target, based on the phase difference and a difference between the first frequency and the second frequency.

20 Claims, 7 Drawing Sheets

(56) References Cited

U.S. PATENT DOCUMENTS

| | | | |
|---|---|---|---|
| 2008/0088500 A1* | 4/2008 | Ishii | G01S 13/584 |
| | | | 342/70 |
| 2019/0250249 A1* | 8/2019 | Raphaeli | G01S 13/582 |
| 2019/0293749 A1* | 9/2019 | Itkin | G01S 13/931 |
| 2020/0333533 A1* | 10/2020 | Rogers | G01S 17/89 |
| 2025/0035767 A1* | 1/2025 | Kashiwagi | G01S 13/584 |

FOREIGN PATENT DOCUMENTS

| | | | |
|---|---|---|---|
| JP | 2012-42214 A | 3/2012 | |
| JP | 2017-26604 A | 2/2017 | |
| JP | 2018-514776 A | 6/2018 | |
| JP | 2018-129670 A | 8/2018 | |
| WO | 2006/134912 A1 | 12/2006 | |
| WO | 2018/198453 A1 | 11/2018 | |

OTHER PUBLICATIONS

International Search Report and Written Opinion mailed on Jun. 29, 2021, received for PCT Application PCT/JP2021/014750, filed on Apr. 7, 2021, 11 pages including English Translation.

Kronauge et al., "New Chirp Sequence Radar Waveform", IEEE Transactions on Aerospace and Electronic Systems, vol. 50, No. 4, Oct. 2014, pp. 2870-2877.

Wang et al., "Frequency Diverse MIMO Radar Sparse Imaging Using Annihilating Filter", IEEE International Conference on Signal Processing, Communication and Computing, 2018, 4 pages.

Japanese Office Action issued Jul. 18, 2023, in corresponding Japanese Patent Application No. 2022-515328, 6pp.

\* cited by examiner

RADAR DEVICE, VEHICLE, AND DISTANCE MEASUREMENT METHOD

CROSS-REFERENCE TO RELATED APPLICATIONS

The present application is a continuation application of International Patent Application No. PCT/JP2021/014750, filed Apr. 7, 2021, which claims priority to Japanese Patent Application No. 2020-074395, filed Apr. 17, 2020, the entire contents of each of which being incorporated herein by reference.

TECHNICAL FIELD

The present disclosure relates to a radar device, a vehicle, and a distance measurement method.

BACKGROUND ART

Radar devices of the related art employ the FMCW system and the binary CW system. In the FMCW system, its range resolutions depend on frequency modulation bandwidths, causing limitation on use of the FMCW system due to frequency bands having their corresponding usable range resolutions. The binary CW system, which uses the Doppler effect, is not applied to a target having the same relative velocity or a stationary target.

CITATION LIST

Patent Document

Patent Document 1: Japanese Unexamined Patent Application Publication No. 2003-167048

SUMMARY

Technical Problems

The radar described in Patent Document 1 is capable of estimating the distance from a target having the same relative velocity or a stationary target, by using the binary CW system. Specifically, the radar described in Patent Document 1 emits two continuous waves of different frequencies, while controlling the continuous waves by using a switch. The radar receives a reflected signal obtained through reflection from a target. The radar described in Patent Document 1 mixes the reflected signal with a radio frequency signal, whose frequency changes in a sawtooth shape, from a local oscillation signal source, and determines the position of the target on the basis of the mixed signal.

However, the radar described in Patent Document 1 uses a window function in preprocessing of a fast Fourier transform on a reflected signal, which is a typical method. The window function fails to appropriately separate, from each other, two reflected signals located at adjacent frequency bins. Therefore, the radar described in Patent Document 1 may cause degradation of the range resolution.

Accordingly, it would be preferably to provide a radar device that enables improvement of its range resolution.

Solution to Problems

A radar device according to an aspect of the present disclosure includes a transmitter that generates, as a transmission wave, an electromagnetic-wave beam including a first chirp signal and a second chirp signal, the first chirp signal being a chirp signal whose frequency changes from a first frequency with time, the second chirp signal being a chirp signal whose frequency changes, with time, from a second frequency different from the first frequency; an antenna for transmitting the transmission wave and receiving a reflected wave obtained by reflecting the transmission wave from a target; and circuitry configured to: estimate a first distance, which is a distance to the target, based on a signal related to the reflected wave; by using a predetermined algorithm for estimating a phase of the reflected wave, estimate a phase difference for the first distance, which is a difference between the phase of the reflected wave corresponding to the first chirp signal and the phase of the reflected wave corresponding to the second chirp signal; and estimate a second distance, which is a distance to the target, based on the phase difference and a difference between the first frequency and the second frequency.

A distance measurement method according to an aspect of the present disclosure includes generating, as a transmission wave, an electromagnetic-wave beam including a first chirp signal and a second chirp signal, the first chirp signal being a chirp signal whose frequency changes from a first frequency with time, the second chirp signal being a chirp signal whose frequency changes, with time, from a second frequency different from the first frequency; transmitting the transmission wave; receiving a reflected wave obtained by reflecting the transmission wave from a target; estimating a first distance, which is a distance to the target, based on a signal related to the reflected wave; by using a predetermined algorithm for estimating a phase of the reflected wave, estimating a phase difference for the first distance, which is a difference between the phase of the reflected wave corresponding to the first chirp signal and the phase of the reflected wave corresponding to the second chirp signal; and estimating a second distance, which is a distance to the target, based on the phase difference and a difference between the first frequency and the second frequency.

Advantageous Effects

The present disclosure may provide a radar device that enables improvement of its range resolution.

DESCRIPTION OF EMBODIMENTS

Referring to the figures, embodiments of the present disclosure will be described below.

===the Configuration of a Radar Device 100 According to a First Embodiment===

Figure 1:
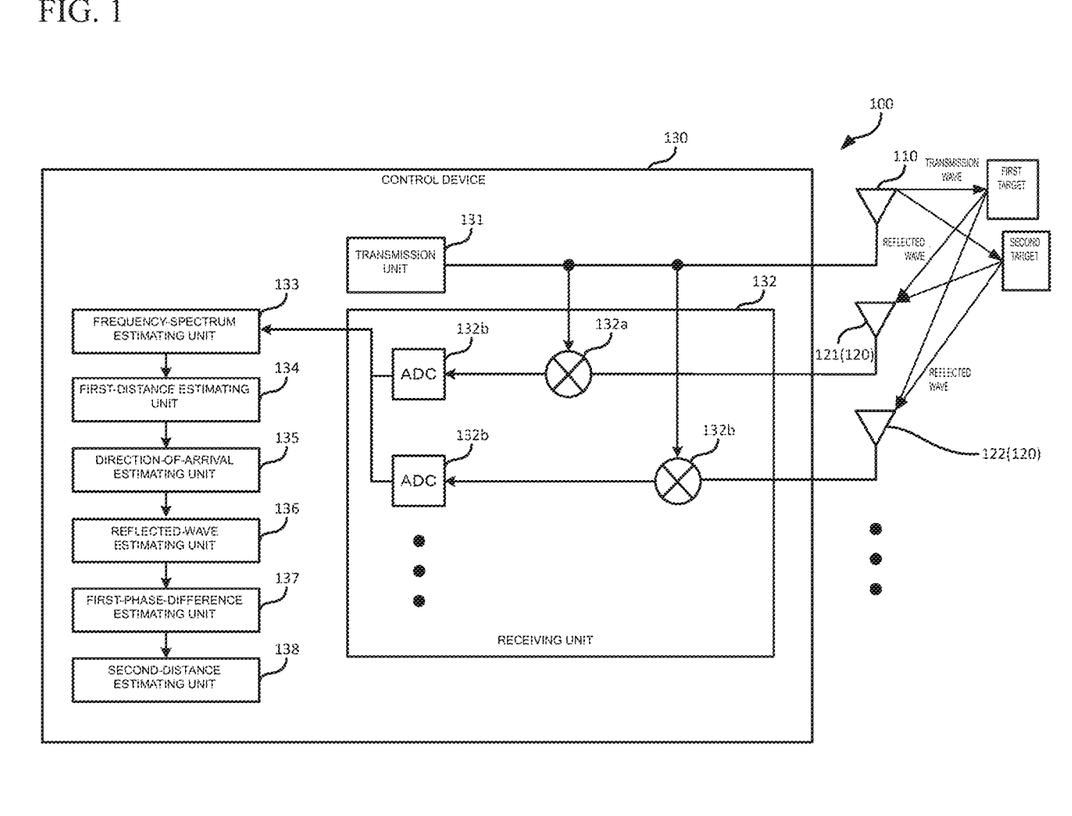
FIG. 1 is a diagram illustrating an exemplary configuration of a radar device according to a first embodiment.

Referring to FIG. 1, the configuration of a radar device 100 according to a first embodiment will be described. FIG. 1 is a diagram illustrating an exemplary configuration of the radar device 100 according to the first embodiment.

The radar device 100 is a device that measures the distance to a target. The radar device 100 is mounted, for example, on a movable body (not illustrated) such as a vehicle, and estimates the distance between the movable body and another target. FIG. 1 illustrates a first target and a second target. However, in the description below, a target refers to at least either the first target or the second target.

As illustrated in FIG. 1, the radar device 100 includes, for example, a transmit antenna 110, a receive antenna 120, and a control device 130.

The transmit antenna 110 is formed, for example, by a microstrip antenna. The transmit antenna 110 transmits transmission waves, for example, to a detection region whose center line is the direction of the radiation directivity thereof.

The receive antenna 120 is formed, for example, by multiple microstrip antennas. The receive antenna 120 receives, for example, reflected waves of transmission waves reflected from a target in the detection region. The receive antenna 120 is capable of receiving, in all directions, for example, reflected waves obtained through reflection from a target in the detection region. For example, the receive antenna 120 electrically converts received reflected waves for output as a detected signal. For convenience of description, it is assumed that the receive antenna 120 is formed, for example, by a first receive antenna 121 and a second receive antenna 122.

The control device 130 is a device that calculates the distance to a target.

The control device 130 includes, for example, a transmission unit (or transmitter) 131, a receiving unit (or receiver) 132, a frequency-spectrum estimating unit (or circuit) 133, a first-distance estimating unit (or circuit) 134, a direction-of-arrival estimating unit (or circuit) 135, a reflected-wave estimating unit (or circuit) 136, a first-phase-difference estimating unit (or circuit) 137, and a second-distance estimating unit (or circuit) 138. Control device 130 includes processing circuitry, such as a programmable processor (e.g., CPU) and memory that holds the program instructions, and/or dedicated logic such as an application specific integrated circuit (ASIC). Each of the units of control device 130 can similarly include such processing circuitry, memory, instructions and/or dedicated logic.

The transmission unit 131 (e.g., transmitter) generates, as a transmission wave, an electromagnetic-wave beam including at least, for example, a chirp signal (hereinafter referred to as a "first chirp signal"), whose frequency changes from a predetermined frequency (hereinafter referred to as a "first frequency") with time, and a chirp signal (hereinafter referred to as a "second chirp signal"), whose frequency changes with time from a frequency (hereinafter referred to as a "second frequency") different from the first frequency. That is, the transmission unit 131 generates a transmission wave in which the initial frequency of the first chirp signal is different from that of the second chirp signal.

Specifically, the transmission unit 131 generates a modulation control signal for forming a transmission wave whose frequency forms a triangular wave at predetermined time intervals in such a manner that the first frequency of the first chirp signal is different from the second frequency of the second chirp signal. The transmission unit 131 changes the oscillation frequency in accordance with the generated modulation control signal. Thus, the transmission unit 131 generates a transmission wave whose oscillation frequency forms triangular waves, in which the initial frequencies of chirp signals are different from each other and for which the modulation zone is repeated at predetermined time intervals. In other words, the transmission unit 131 generates a transmission wave, for example, by using a frequency modulated continuous wave (FMCW) system in which the initial frequency in chirp signals is varied.

Figure 2:
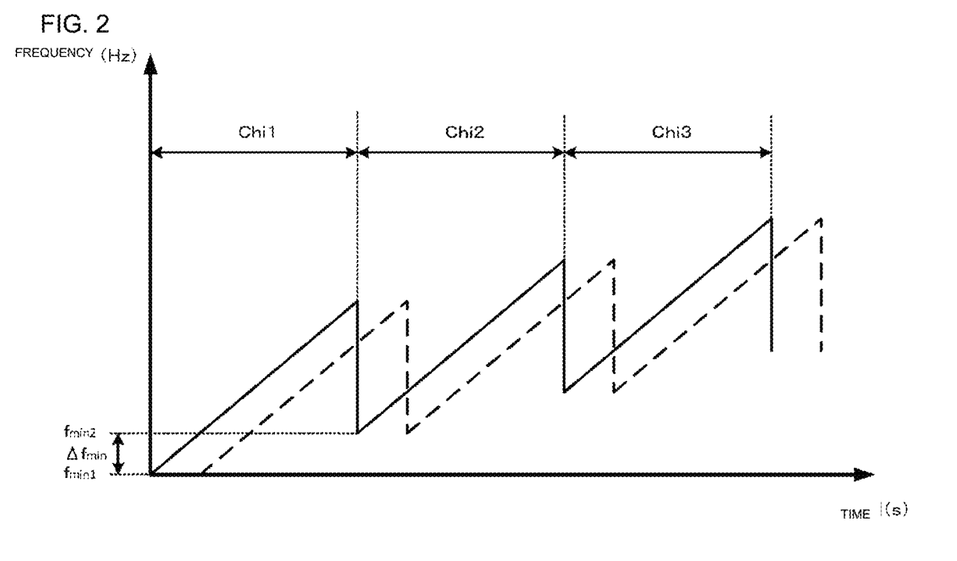
FIG. 2 is a graph of the relationship, in transmission wave, between elapsed time and change of frequency.

Referring to FIG. 2, a transmission wave generated by the transmission unit 131 will be described in detail below. FIG. 2 is a graph of the relationship, in transmission wave, between elapsed time and change of frequency. In FIG. 2, X axis represents elapsed time s, and Y axis represents frequency Hz of transmission wave. In FIG. 2, a solid line indicates a transmission wave, and a broken line indicates a reflected wave that is received.

As illustrated in FIG. 2, the transmission unit 131 generates the first chirp signal (Chi1) whose frequency increases monotonically from the first frequency $f_{min1}$ with elapsed time. After elapse of a predetermined time, the transmission unit 131 generates the second chirp signal (Chi2) whose frequency increases monotonically from the second frequency $f_{min2}$ with elapsed time. Similarly, after elapse of the predetermined time, the transmission unit 131 may generate a chirp signal whose frequency increases monotonically from a frequency higher than the second frequency. Thus, the transmission unit 131 may generate a transmission wave in which the modulator zone is repeated at the predetermined time intervals. The following description will focus on the first frequency $f_{min1}$ and the second frequency $f_{min2}$. The frequency difference between the first frequency $f_{min1}$ and the second frequency $f_{min2}$ may be referred to as "$\Delta f_{min}$". FIG. 2 illustrates equal modulator zones for the chirp signals. Alternatively, the modulator zones may be different from each other. The chirp signals are not limited to those that increase monotonically. For example, the chirp signal may decrease monotonically.

The receiving unit 132 (e.g., receiver) generates an IF beat signal, for example, by mixing a received wave with a transmission wave. The received wave is obtained by combining reflected waves from targets that are received by the receive antenna 120. The receiving unit 132 includes, for example, mixers 132a and ADCs (analog to digital converters) 132b.

Each mixer 132a mixes a received wave with a transmission wave and generates an IF beat signal of a predetermined frequency. The IF beat signal is amplified by a reception amplifier (not illustrated), and the amplified signal is output to the corresponding one of the ADCs 132b.

Each ADC 132b converts the analog IF beat signal into a digital IF beat signal and outputs the converted signal to the frequency-spectrum estimating unit 133. As an ADC 132b, for example, a typical analog-digital conversion circuit is used. Examples of an ADC 132b include various types, such as the flash type, the pipeline type, the successive approximation type, the delta sigma type, and the double integral type.

For example, the frequency-spectrum estimating unit 133 includes circuitry configured to perform a fast Fourier transform on an input digital IF beat signal to generate a frequency spectrum. The frequency-spectrum estimating unit 133 includes circuitry configured to estimate the frequency $f_{peak}$ indicating the peak of power of the IF beat signal corresponding to a chirp signal.

The first-distance estimating unit 134 includes circuitry configured to estimate a distance (hereinafter referred to as a "first distance") with respect to targets on the basis of the frequency $f_{peak}$ estimated by the frequency-spectrum estimating unit 133.

Figure 3:
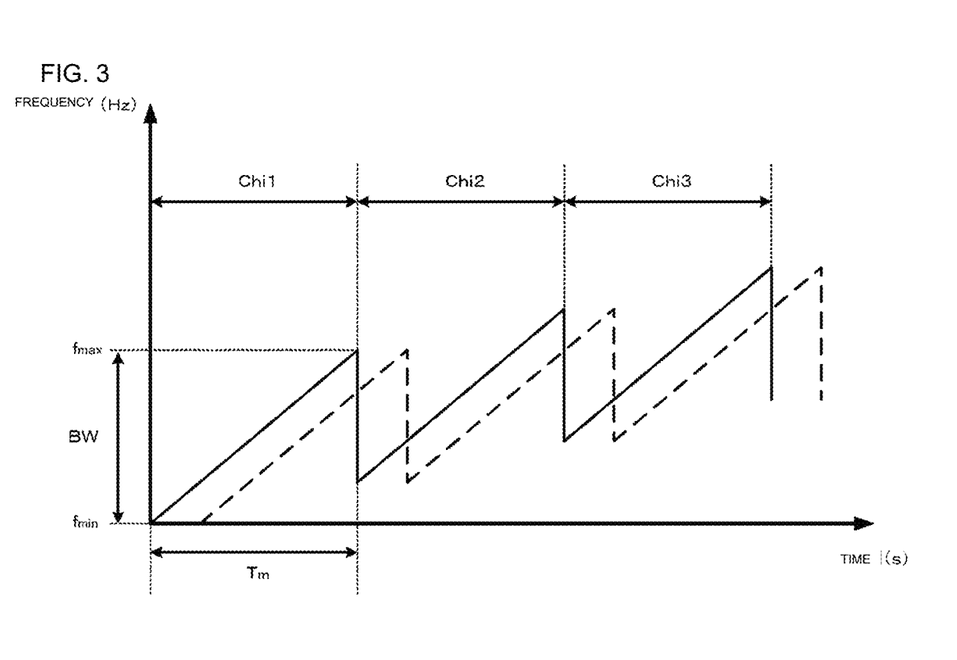
FIG. 3 is a graph of the relationship, in transmission wave, between elapsed time and change of frequency, for estimating a first distance.

Referring to FIG. 3, the procedure of estimating a first distance will be described. FIG. 3 is a graph of the relationship, in transmission wave, between elapsed time and change of frequency, for estimating a first distance. In FIG. 3, X axis represents elapsed time t, and Y axis represents frequency Hz of transmission wave. In FIG. 3, a solid line indicates a transmission wave, and a broken line indicates a reflected wave that is received.

The first-distance estimating unit 134 includes circuitry configured to estimate a first distance on the basis of the use bandwidth BW between the minimum frequency $f_{min}$ and the maximum frequency $f_{max}$ of a chirp signal of the transmission wave, the period $T_m$ of the chirp signal, and the frequency $f_{peak}$. Specifically, the frequency $f_{peak}$ estimated by the frequency-spectrum estimating unit 133 is substituted into "$f_{peak}$" in Expression (1) to estimate a distance. Thus, the first-distance estimating unit 134 may estimate the first distance R1 which is an approximate distance with respect to targets.

$$R1=((c \times T_m)/(2 \times BW)) \times f_{peak} \quad (1)$$

(BW: frequency bandwidth in use, $T_m$: chirp period, c: the speed of light, $f_{peak}$: peak frequency value after application of FFT to a beat signal)

The direction-of-arrival estimating unit 135 includes circuitry configured to estimate, for example, the directions (hereinafter referred to as the "directions of arrival"), for the first distance, in which the reflected waves arrive, on the basis of a received wave obtained by combining reflected waves received by the first receive antenna 121, and a received wave obtained by combining reflected waves received by the second receive antenna 122. In other words, the direction-of-arrival estimating unit 135 estimates, for example, the angles of targets with respect to the radar device 100.

Specifically, the direction-of-arrival estimating unit 135 applies the AF (Annihilating filter) method to the received waves which are received by the first receive antenna 121 and the second receive antenna 122. Thus, the direction-of-arrival estimating unit 135 estimates the angles (directions of arrival) for the first distance that are formed between the targets and at least either the first receive antenna 121 or the second receive antenna 122.

The AF method is a method of estimating the angles (directions of arrival) by calculating the phase differences between the antennas. The phase differences are calculated through a filter which uses, as input, a received wave received by the first receive antenna 121 and a received wave received by the second receive antenna 122, and whose output is equal to "0".

Figure 4:
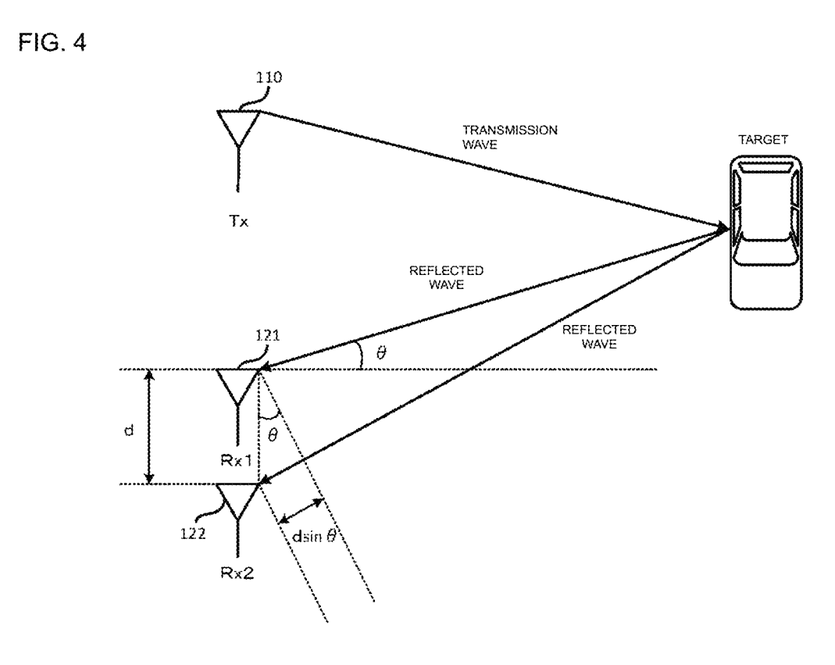
FIG. 4 is a schematic diagram illustrating estimation of a direction of arrival.

The direction-of-arrival estimating unit 135 is not limited to estimation of angles through application of the AF method. Referring to FIG. 4, another method example of estimating an angle (direction of arrival) by the direction-of-arrival estimating unit 135 will be described. FIG. 4 is a schematic diagram illustrating estimation of a direction of arrival.

In FIG. 4, the distance between the first receive antenna 121 and the second receive antenna 122 (hereinafter referred to as the "between-antennas distance") is represented by "d", and the angle of a target with respect to the first receive antenna 121 is represented by "θ". In the description below, the phase of a reflected wave received by the first receive antenna 121 is represented by "φ1", and the phase of a reflected wave received by the second receive antenna 122 is represented by "φ2".

As illustrated in FIG. 4, the reflected wave received by the second receive antenna 122 propagates a longer distance of $d \times \sin(\theta)$ than the reflected wave received by the first receive antenna 121. If the distances between the antennas and the target are sufficiently longer than the between-antennas distance, the phase difference is calculated by using Expression (2).

$$\Delta\varphi = (2\pi d \times \sin(\theta))/\lambda \quad (2)$$

(φ: the phase difference in reflected wave between antennas, d: the between-antennas distance)

Therefore, the angle θ is calculated by using Expression (3).

$$\theta = \sin^{-1}((\lambda \times \Delta\varphi)/(2\pi \times d)) \quad (3)$$

Alternatively, the direction-of-arrival estimating unit 135 may estimate the directions of arrival by using the MODE method (frequency response analysis).

The reflected-wave estimating unit 136 includes circuitry configured to estimate reflected waves from targets on the basis of the angles estimated by the direction-of-arrival estimating unit 135. Referring to Expression (4), the method of estimating reflected waves will be described. Expression (4) is a determinant for estimating reflected waves.

[Math. 1]

$$\begin{bmatrix} 1 & 1 & \cdots & 1 \\ Z_1^1 & Z_2^1 & \cdots & Z_k^1 \\ \vdots & \vdots & \ddots & \vdots \\ Z_1^{M-1} & Z_2^{M-1} & \cdots & Z_k^{M-1} \end{bmatrix} \begin{bmatrix} A_1 e^{j\alpha_1} \\ A_2 e^{j\alpha_2} \\ \vdots \\ A_k e^{j\alpha_k} \end{bmatrix} = \begin{bmatrix} X(1) \\ X(2) \\ \vdots \\ X(M) \end{bmatrix} \quad (4)$$
$$\quad\quad (a) \quad\quad\quad\quad (b) \quad\quad\quad (c)$$

As illustrated in Expression (4), in the determinant, Vandermonde matrix (a), having the estimated angles as elements, is multiplied by vector (b) of reflected waves from targets, which is a coefficient matrix, and the result is associated with vector (c) which indicates receive signals.

In matrix (a), "Z" represents a complex number derived from an angle θ (estimated direction), and is expressed, for example, as $Z=e^{j\theta}$. The index added to "Z" represents the estimated number of reflected waves. "M" represents the number of receive antennas. In matrix (b), "A" represents the amplitude of a reflected wave; "α" represents the phase of a reflected wave. In matrix (c), "X" represents a receive signal at the corresponding one of the antennas.

Since matrix (a) indicating the estimated angles is not "0", matrix (a) may be expressed as an inverse matrix. Each element "X" in matrix (c) indicating a receive signal is determined on the basis of reflected waves. Therefore, the reflected-wave estimating unit 136 uniquely estimates each element included in vector (b) of reflected waves from targets. Thus, the reflected-wave estimating unit 136 estimates the phase α of the reflected wave from the target of interest.

On the basis of the phase related to the reflected waves estimated by the reflected-wave estimating unit 136, the first-phase-difference estimating unit 137 includes circuitry configured to estimate the phase difference for the first distance corresponding to the difference between the phase of a reflected wave from the target corresponding to the first chirp signal, and the phase of a reflected wave from the target corresponding to the second chirp signal.

Figure 5:
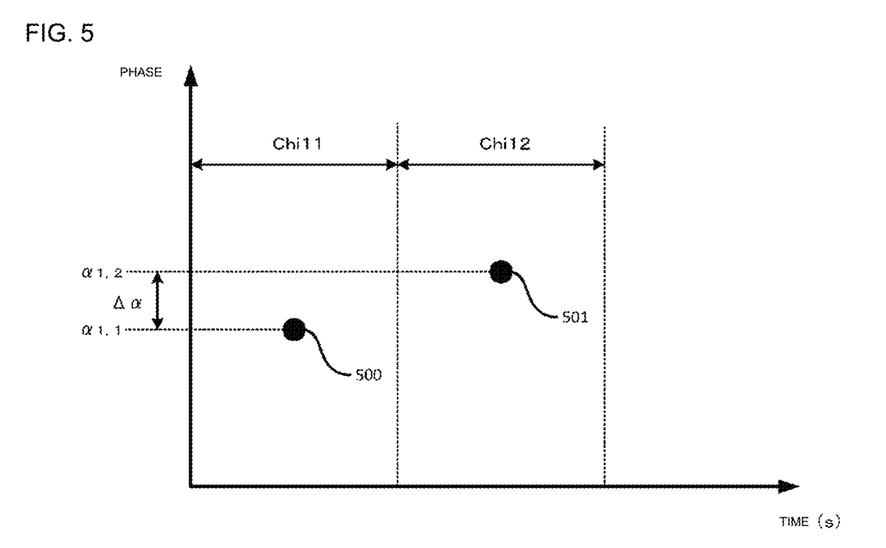
FIG. 5 is a graph of phases of chirp signals.

Referring to FIG. 5, the phase difference will be described. FIG. 5 is a graph of the phases of reflected waves from the target for the chirp signals. In FIG. 5, X axis represents elapsed time t, and Y axis represents the phase of reflected wave for chirp signal. In FIG. 5, reference numeral 500 denotes the phase of a reflected wave from the target corresponding to the first chirp signal (Chi11); reference numeral 501 denotes the phase of a reflected wave from the target corresponding to the second chirp signal (Chi12).

As illustrated in FIG. 5, the first-phase-difference estimating unit 137 determines, for example, the phase $\alpha_{1,1}$ of the reflected wave from the target corresponding to the first chirp signal Chi11, and the phase $\alpha_{1,2}$ of the reflected wave from the target corresponding to the second chirp signal Chi12. The first-phase-difference estimating unit 137 calculates the phase difference $\Delta\alpha$ between the phase $\alpha_{1,1}$ and the phase $\alpha_{1,2}$. The case is described in which the phase difference between the phase of the reflected wave from the target corresponding to the first chirp signal and the phase of the reflected wave from the target corresponding to the second chirp signal is calculated. However, this refers to calculation of the phase differences between two or more chirp signals whose initial frequencies are different from each other.

The second-distance estimating unit 138 includes circuitry configured to estimate the distance (hereinafter referred to as the "second distance") from the target by using Expression (5) on the basis of the phase difference $\Delta\alpha$ and the difference $\Delta f_{min}$ between the first frequency $f_{min1}$ and the second frequency $f_{min2}$.

$$R2=(c\times\Delta\alpha)/(4\pi\times\Delta f_{min}) \quad (5)$$

(R2: second distance, $\Delta\alpha$: the phase difference between reflected waves from the target corresponding to the chirp signals, $\Delta f_{min}$: the difference between the first frequency and the second frequency)

Thus, a second distance having a range resolution higher than that of a first distance may be estimated.

Figure 6:
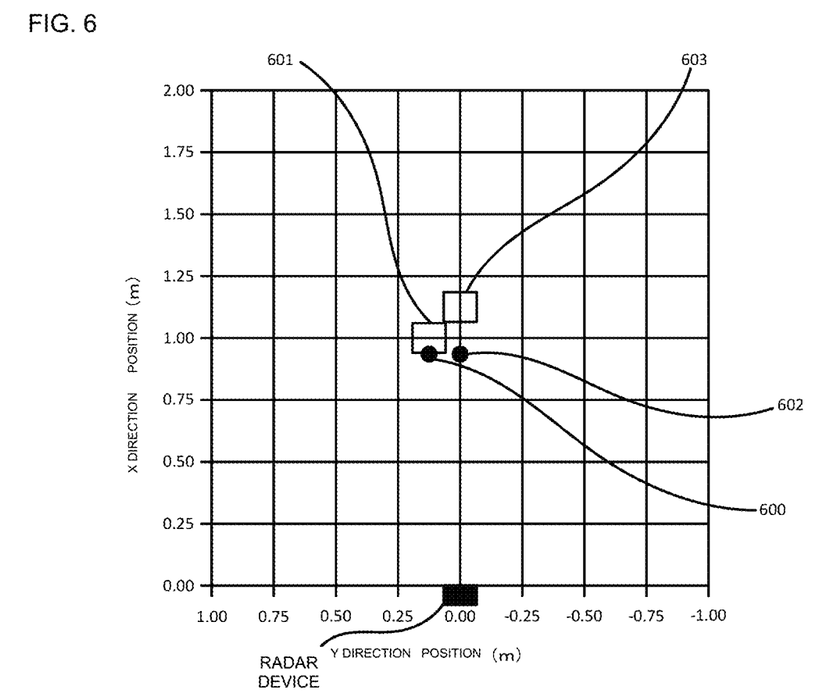
FIG. 6 is a diagram illustrating the range resolution of a radar device of the related art.
Figure 7:
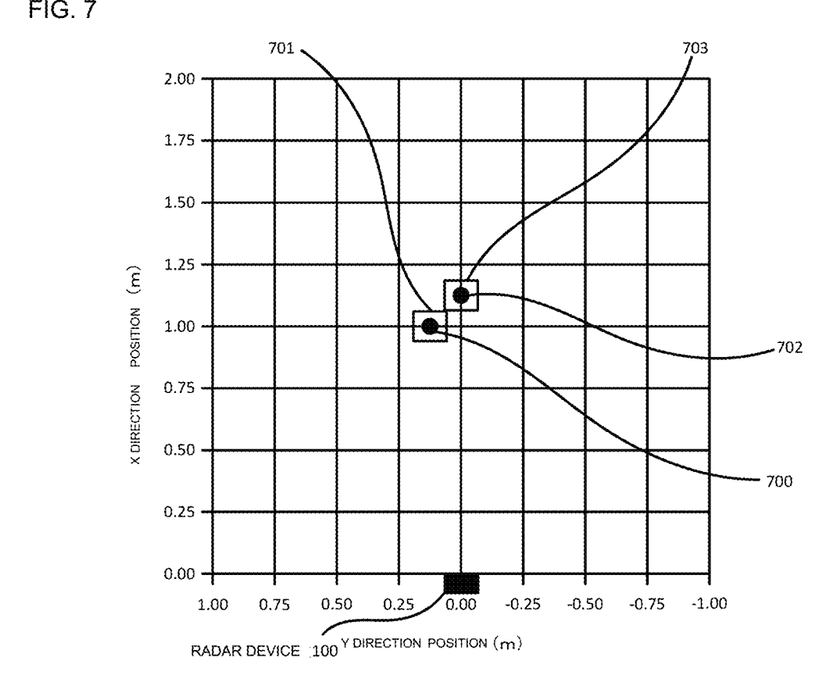
FIG. 7 is a diagram illustrating the range resolution of a radar device according to the first embodiment.

Referring to FIGS. 6 and 7, the effect of the radar device according to the first embodiment will be described in comparison with that of a radar device of the related art.

FIG. 6 is a diagram illustrating the range resolution of a radar device of the related art. In FIG. 6, the horizontal axis represents position in the horizontal direction (Y direction) of target, and the vertical axis represents position in the distance direction (X direction) of target. That is, FIG. 6 illustrates the positional relationship obtained when the radar device of the related art and first and second targets are viewed in plan. It is assumed that the radar device of the related art is disposed at "0.00" of the horizontal axis in FIG. 6. In FIG. 6, reference numeral 600 denotes the estimated position of the first target; reference numeral 601 denotes the actual position of the first target; reference numeral 602 denotes the estimated position of the second target; and reference numeral 603 denotes the actual position of the second target.

The radar device, using the FSK system, of the related art does not use chirp signals. Thus, the radar device is capable of estimating a distance only when there is a difference in relative velocity from a target. That is, the radar device of the related art is not capable of estimating the distance from a target from which the difference in relative velocity is "0".

The radar device, using FMCW or FCM, of the related art has a degraded range resolution due to a window function in a fast Fourier transform. As illustrated in FIG. 6, although the radar device of the related art may separate the two targets from each other through estimation of the directions of arrival, an error occurs between the estimated position of a target and the actual position of the target due to the degraded range resolution (the targets fail to be separated from each other in the distance direction). Therefore, the radar device of the related art estimates that a target and a different target, which have different actual positions, are located at the same distance.

FIG. 7 is a diagram illustrating the range resolution of the radar device 100 according to the first embodiment. In FIG. 7, the horizontal axis represents position in the horizontal direction (Y direction) of target, and the vertical axis represents position in the distance direction (X direction) of target. That is, FIG. 7 illustrates the positional relationship obtained when the radar device 100 and the first and second targets are viewed in plan. The radar device 100 is disposed at "0.00" of the horizontal axis. In FIG. 7, reference numeral 700 denotes the estimated position of the first target; reference numeral 701 denotes the actual position of the first target; reference numeral 702 denotes the estimated position of the second target; and reference numeral 703 denotes the actual position of the second target.

As described above, the radar device 100 according to the first embodiment generates a transmission wave so that the initial frequency of the first chirp signal is different from that of the second chirp signal.

Thus, the radar device 100 according to the first embodiment is capable of estimating a change in phase of a reflected wave from a target. Thus, the radar device 100 is capable of estimating the distance to a target with higher accuracy. Therefore, as illustrated in FIG. 7, the radar device 100 according to the first embodiment may separate two targets from each other also in the distance direction (X direction). This is because degradation in the range resolution due to a window function in a fast Fourier transform does not occur.

In addition, the radar device 100 according to the first embodiment uses the FMCW system. Thus, the radar device 100 is capable of estimating the distance even from a target whose relative velocity is "0".

Further, for the radar device 100 according to the first embodiment, the initial frequencies of the chirp signals may be set to any values, and a pattern specific to the radar device may be configured. Thus, reflected waves from another radar device may be identified.

===the Configuration of a Radar Device 200 According to a Second Embodiment===

Figure 8:
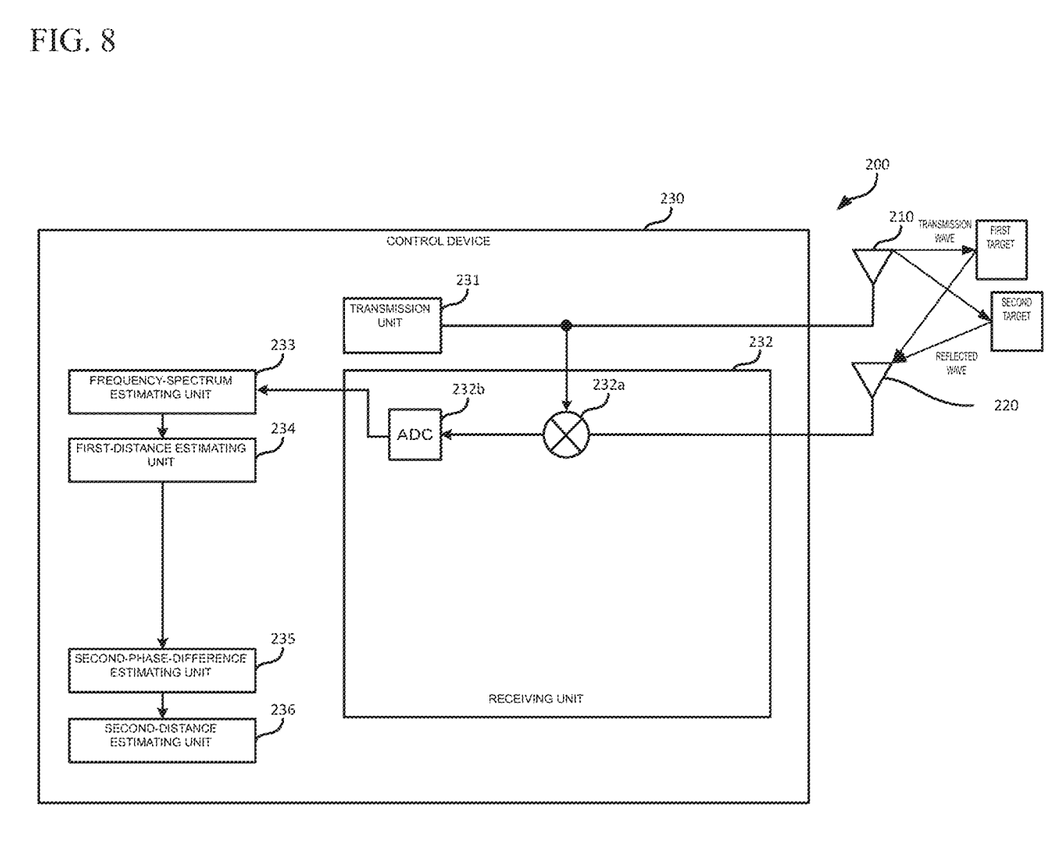
FIG. 8 is a diagram illustrating an exemplary configuration of a radar device according to a second embodiment.
Figure 9:
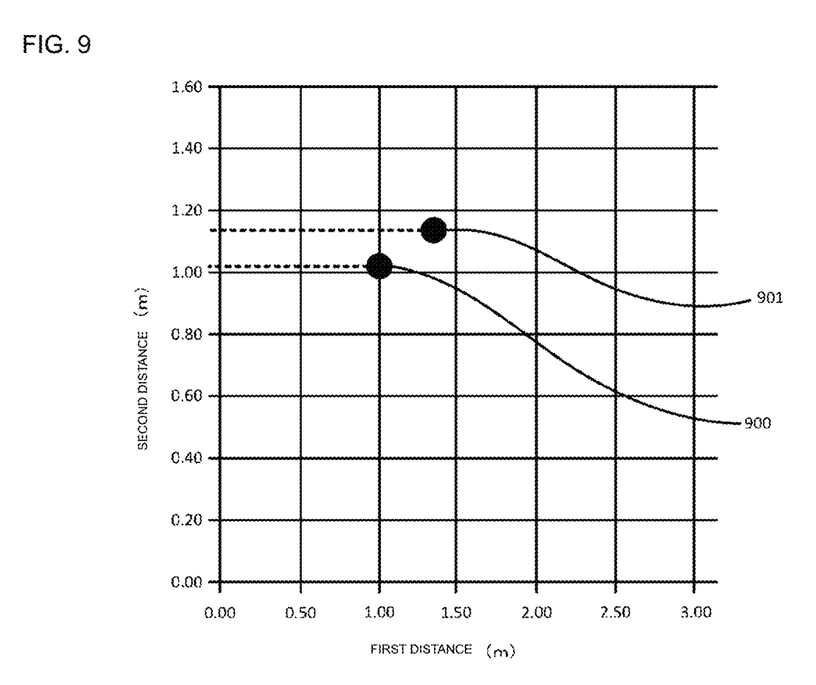
FIG. 9 is a graph of the relationship between first distance and second distance of a radar device according to the second embodiment.

Referring to FIGS. 8 and 9, the configuration of a radar device 200 according to a second embodiment will be described. FIG. 8 is a diagram illustrating an exemplary configuration of the radar device 200 according to the second embodiment. FIG. 9 is a graph of the relationship between the first distance and the second distance of the radar device 200 according to the second embodiment. In FIG. 9, the horizontal axis represents the first distance and the vertical axis represents the second distance. In FIG. 9, reference numeral 900 denotes the estimated position of a first target; and reference numeral 901 denotes the estimated position of a second target.

The radar device 200 according to the second embodiment includes, for example, a transmit antenna 210, a receive antenna 220, a transmission unit (e.g., a transmitter)

231, a receiving unit (e.g., a receiver) 232, a frequency-spectrum estimating unit (or circuit) 233, a first-distance estimating unit (or circuit) 234, a second-phase-difference estimating unit (or circuit) 235, and a second-distance estimating unit (or circuit) 236.

The radar device 200 according to the second embodiment is different from the radar device 100 according to the first embodiment in that the direction-of-arrival estimating unit 135, the reflected-wave estimating unit 136, and the first-phase-difference estimating unit 137 are excluded, and in that the second-phase-difference estimating unit 235 is added.

The transmit antenna 210, the transmission unit 231, the frequency-spectrum estimating unit 233, the first-distance estimating unit 234, and the second-distance estimating unit 236 in the radar device 200 according to the second embodiment are the same as the transmit antenna 110, the transmission unit 131, the frequency-spectrum estimating unit 133, the first-distance estimating unit 134, and the second-distance estimating unit 138 in the radar device 100 according to the first embodiment, and will not be described.

In the radar device 200 according to the second embodiment, for example, reflected waves may be received by a single receive antenna 220 (third receive antenna). That is, the radar device 200 according to the second embodiment may include the receive antenna 220 formed by a single antenna. This is because the radar device 200 does not estimate the angle of a target (direction of arrival).

For example, the transmission unit 231 (e.g., a transmitter) transmits, as a transmission wave, an electromagnetic-wave beam including a first chirp signal and a second chirp signal whose frequencies increase or decreases proportionally. A proportional increase or decrease refers to, for example, monotonic increase or decrease.

For example, the transmission unit 231 transmits, as a transmission wave, an electromagnetic-wave beam including the first chirp signal and the second chirp signal whose time widths are equal to each other.

The second-phase-difference estimating unit 235 includes circuitry configured to estimate the phase differences, of the reflected waves, between the chirp signals, for example, through a fast Fourier transform. Other than a fast Fourier transform, the second-phase-difference estimating unit 235 may estimate the phase differences of the reflected waves between the chirp signals by using a different phase detection algorithm in which a phase difference may be estimated through a correlation procedure.

Specifically, the second-phase-difference estimating unit 235 estimates an IF beat signal $V_{IF1}$, for example, corresponding to a first target by using Expression (6).

[Math. 2]
$$V_{IF1} = \frac{A_{tx} \cdot A_{rx}}{2} \cos 2\pi \left[ \frac{2R_1 BW}{cTm} t + \frac{2R_1 f_{min\,n}}{c} \right] \quad (6)$$

($A_{tx}$: the amplitude of a transmission wave, $A_{rx}$: the amplitude of a received wave, R1: first distance, BW: frequency bandwidth in use, c: the speed of light, $T_m$: chirp period, $f_{min\,n}$: the initial frequency of the n-th chirp signal)

The part, $(2\pi(2R_1 \times f_{min\,n})/c))$, in Expression (6) is transformed, and the phase $\alpha_{1,n}$ of a reflected wave corresponding to the n-th chirp signal may be estimated as illustrated in Expression (7).

[Math. 3]
$$\alpha_{1,n} = \frac{4\pi R_1 f_{min\,n}}{c} \quad (7)$$

Therefore, on the basis of Expression (7), the second-phase-difference estimating unit 235 may estimate the phase difference $\Delta\alpha_1$, for example, as illustrated in FIG. 5, between the phase $\alpha_{1,1}$ of the reflected wave corresponding to the chirp signal Chi11 and the phase $\alpha_{1,2}$ of the reflected wave corresponding to the chirp signal Chi12.

Similarly, the second-phase-difference estimating unit 235 may estimate the phase difference $\Delta\alpha_2$ between chirp signals on the basis of IF beat signals corresponding to the second target.

That is, the radar device 200 according to the second embodiment changes the initial frequencies of chirp signals for a transmission wave. Thus, the radar device 200 may separate targets from each other and may estimate the second distances of the targets described below.

Like the radar device 100 according to the first embodiment, the radar device 200 according to the second embodiment uses the second-distance estimating unit 236 having circuitry configured to estimate the distance to a target by using Expression (5). That is, as illustrated in FIG. 9, the second-distance estimating unit 236 estimates a second distance, which is a precise distance, with respect to a first distance, which is an approximate distance.

Thus, the radar device 200 according to the second embodiment may achieve a range resolution higher than that of a radar device of the related art. The radar device 200 according to the second embodiment, which may have only one receive antenna 220, has a simple configuration.

===the Configuration of a Radar Device 300 According To a Third Embodiment===

Figure 10:
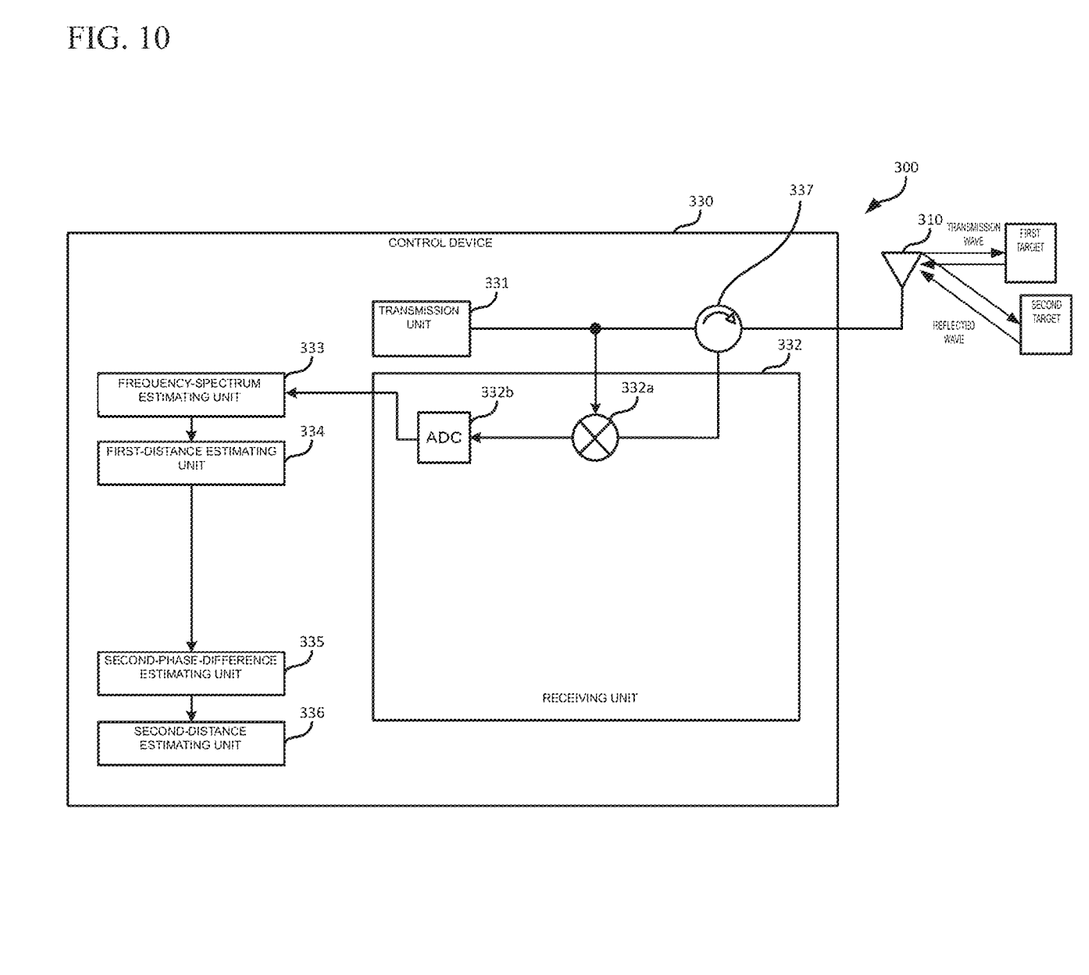
FIG. 10 is a diagram illustrating an exemplary configuration of a radar device according to a third embodiment.

Referring to FIG. 10, the configuration of a radar device 300 according to a third embodiment will be described. FIG. 10 is a diagram illustrating an exemplary configuration of the radar device 300 according to the third embodiment.

The radar device 300 according to the third embodiment is different from the radar device 200 according to the second embodiment in that the receive antenna 220 is excluded, and in that a separating unit (or circuit) 337 is added. The other components of the radar device 300 according to the third embodiment will not be described below.

A transmit/receive antenna 310 is formed by a single antenna that transmits a transmission wave and that receives reflected waves obtained by reflecting the transmission wave from first and second targets.

The separating unit 337 is, for example, a circulator or other circuitry connected to the transmit/receive antenna 310 and configured to separate a signal related to the transmission wave from a signal related to the reflected waves.

Thus, transmission of a transmission wave and reception of reflected waves may be implemented by using a single antenna, achieving reduction of the module area and reduction of the radar device 300 in size.

===Conclusion===

A radar device 100, 200 according to an exemplary embodiment of the present disclosure includes a transmission unit (or circuit) 131, 231 that generates, as a transmission wave, an electromagnetic-wave beam including a first chirp signal and a second chirp signal, the first chirp signal being a chirp signal whose frequency changes from a first frequency with time, the second chirp signal being a chirp signal whose frequency changes, with time, from a second frequency different from the first frequency; an antenna 110, 120 for transmitting the transmission wave and receiving a reflected wave obtained by reflecting the transmission wave from a target; a first-distance estimating unit (or circuit) 134, 234 that estimates a first distance, which is a distance to the target, based on a received wave which is a signal related to the reflected wave; first and second phase-difference estimating units (or circuits) 137, 235 (phase-difference estimating unit) that, by using a predetermined algorithm for estimating a phase of the reflected wave, estimate a phase difference $\Delta\alpha$, for the first distance, which is a difference between the phase of the reflected wave corresponding to the first chirp signal and the phase of the reflected wave corresponding to the second chirp signal; and a second-distance estimating unit (or circuit) 138, 236 that estimates a second distance which is a distance to the target, based on the phase difference $\Delta\alpha$ and a difference $\Delta f_{min}$ between the first frequency and the second frequency. Thus, the radar device 100, 200 may achieve a higher range resolution with a simple device configuration. In addition, the radar device 100, 200 may estimate the distance from a stationary object. Further, the radar device 100, 200 changes the initial frequencies of the chirps, achieving reduction of interference from other radar devices.

A receiving unit 132 of the radar device 100 includes a first receive antenna 121 and a second receive antenna 122. The radar device 100 further includes a direction-of-arrival estimating unit 135 that estimates a direction of arrival, for the first distance, which is a direction in which the reflected wave arrives, based on the reflected wave received by the first receive antenna 121 and the reflected wave received by the second receive antenna 122. The first phase-difference estimating unit 137 estimates the phase difference, by using a method for determining the reflected wave from the target, based on the direction of arrival. Thus, the radar device 100 may estimate the distance from a target with a high range resolution.

The direction-of-arrival estimating unit 135 of the radar device 100 estimates the direction of arrival by using the AF method. Thus, the radar device 100 may estimate the angle with respect to a target with high accuracy, achieving estimation of the distance from the target with a high range resolution.

The receiving unit 232 of the radar device 200 receives the reflected wave only by using a receive antenna 220 (third receive antenna). Thus, the radar device 200 has a simple configuration while high accuracy in estimation of a distance is maintained.

A transmit/receive antenna 310 of the radar device 300 includes a single antenna that transmits the transmission wave and that receives the reflected wave. The radar device 300 further includes a separating unit (or circuit) 337 that is connected to the transmit/receive antenna 310 and that is configured to separate a signal related to the transmission wave from the signal related to the reflected wave. Thus, transmission/reception is performed by using a single antenna, achieving reduction of the radar device in size.

The transmission unit 131, 231, 331 of the radar device 100, 200, 300 transmits, as the transmission wave, the electromagnetic-wave beam including the first chirp signal and the second chirp signal whose frequencies change proportionally. Thus, the radar device 200, 300 may estimate the distance from a target with a high range resolution.

The transmission unit 131, 231, 331 of the radar device 100, 200, 300 transmits, as the transmission wave, the electromagnetic-wave beam including the first chirp signal and the second chirp signal whose time widths are equal to each other. Thus, the radar device 100, 200, 300 may estimate the distance from a target with a high range resolution.

The embodiments described above are intended to facilitate understanding of the present disclosure, not to be provided for interpretation of the present disclosure with limitation. The present disclosure may be changed or improved without departing from the gist of the present disclosure. In addition, the present disclosure encompasses its equivalent. That is, an embodiment, which is obtained by those skilled in the art who add changes to the design of the embodiments as appropriate, is encompassed in the scope of the present disclosure as long as it has the features of the present disclosure. Devices included in the embodiments and their arrangement are not limited to those described illustratively, and may be changed appropriately.

REFERENCE SIGNS LIST 100, 200, 300 radar device
110, 210 transmit antenna
120, 220 receive antenna
130, 230, 330 control device
131, 231, 331 transmission unit
132, 232, 332 receiving unit
133, 233, 333 frequency-spectrum estimating unit
134, 234, 334 first-distance estimating unit
135 direction-of-arrival estimating unit
136 reflected-wave estimating unit
137 first-phase-difference estimating unit
235, 335 second-phase-difference estimating unit
138, 236, 336 second-distance estimating unit

The invention claimed is:
1. A radar device comprising:
a transmitter configured to generate, as a transmission wave, an electromagnetic-wave beam including a first chirp signal and a second chirp signal, the first chirp signal being a chirp signal whose frequency changes from a first frequency with time, and the second chirp signal being a chirp signal whose frequency changes, with time, from a second frequency different from the first frequency;
an antenna for transmitting the transmission wave and receiving a reflected wave obtained by reflecting the transmission wave from a target; and
circuitry configured to:
estimate a first distance, which is a distance to the target, based on a signal related to the reflected wave;
estimate a direction of arrival for the first distance based on the reflected wave;
by using a predetermined algorithm for estimating a phase of the reflected wave, estimate a phase difference for the first distance, which is a difference between a phase of the reflected wave corresponding to the first chirp signal and a phase of the reflected wave corresponding to the second chirp signal, wherein the predetermined algorithm determines the phase of the reflected wave corresponding to the first chirp signal and the phase of the reflected wave corresponding to the second chirp signal based on the first-distance direction of arrival; and estimate a second distance, which is a distance to the target, based on the phase difference and a difference between the first frequency and the second frequency.

2. The radar device according to claim 1,
wherein the antenna comprises a first receive antenna and a second receive antenna that receive the reflected wave,
wherein the circuitry is further configured to:
estimate the direction of arrival for the first distance, which is a direction in which the reflected wave arrives, based on the reflected wave received by the first receive antenna and the reflected wave received by the second receive antenna; and
estimate the phase difference by using a method for determining the reflected wave from the target based on the direction of arrival, wherein the phase difference is estimated using the following $$\Delta\varphi=(2\pi d\times \sin(\theta))/\lambda$$

wherein $\lambda$ is a wavelength of the reflected wave, $\theta$ is the direction of arrival, d is a distance between the first receive antenna and the second receive antenna, and $\Delta\varphi$ is the phase difference.

3. The radar device according to claim 2,
wherein the circuitry is further configured to estimate the direction of arrival by using an AF (Annihilating filter) method.

4. The radar device according to claim 1,
wherein the antenna receives the reflected wave only by using a single receive antenna.

5. The radar device according to claim 1,
wherein the antenna comprises a single antenna that transmits the transmission wave and that receives the reflected wave, and
wherein the circuitry is connected to the single antenna and is further configured to separate a signal related to the transmission wave from the signal related to the reflected wave.

6. The radar device according to claim 1,
wherein the transmitter is configured to transmit, as the transmission wave, the electromagnetic-wave beam including the first chirp signal and the second chirp signal whose frequencies change proportionally.

7. The radar device according to claim 1,
wherein the transmitter is configured to transmit, as the transmission wave, the electromagnetic-wave beam including the first chirp signal and the second chirp signal whose time widths are equal to each other.

8. A vehicle comprising the radar device according to claim 1.

9. The radar device according to claim 2,
wherein the transmitter is configured to transmit, as the transmission wave, the electromagnetic-wave beam including the first chirp signal and the second chirp signal whose frequencies change proportionally.

10. The radar device according to claim 2,
wherein the transmitter is configured to transmit, as the transmission wave, the electromagnetic-wave beam including the first chirp signal and the second chirp signal whose time widths are equal to each other.

11. A distance measurement method comprising the steps of:
generating, as a transmission wave, an electromagnetic-wave beam including a first chirp signal and a second chirp signal, the first chirp signal being a chirp signal whose frequency changes from a first frequency with time, and the second chirp signal being a chirp signal whose frequency changes, with time, from a second frequency different from the first frequency;
transmitting the transmission wave;
receiving a reflected wave obtained by reflecting the transmission wave from a target;
estimating a first distance, which is a distance to the target, based on a signal related to the reflected wave;
estimating a direction of arrival for the first distance based on the reflected wave;
by using a predetermined algorithm for estimating a phase of the reflected wave, estimating a phase difference for the first distance, which is a difference between a phase of the reflected wave corresponding to the first chirp signal and a phase of the reflected wave corresponding to the second chirp signal, wherein the predetermined algorithm determines the phase of the reflected wave corresponding to the first chirp signal and the phase of the reflected wave corresponding to the second chirp signal based on the direction of arrival; and
estimating a second distance, which is a distance to the target, based on the phase difference and a difference between the first frequency and the second frequency.

12. The method according to claim 11,
wherein an antenna for transmitting and receiving includes a first receive antenna and a second receive antenna,
the method further comprising:
estimating the direction of arrival for the first distance, which is a direction in which the reflected wave arrives, based on the reflected wave received by the first receive antenna and the reflected wave received by the second receive antenna; and
estimating the phase difference by using a method for determining the reflected wave from the target based on the direction of arrival, wherein the phase difference is estimated using the following $$\Delta\varphi=(2\pi d\times \sin(\theta))/\lambda$$

wherein $\Delta$ is a wavelength of the reflected wave, $\theta$ is the direction of arrival, d is a distance between the first receive antenna and the second receive antenna, and $\Delta\varphi$ is the phase difference.

13. The method according to claim 12, the method further comprising estimating the direction of arrival by using an AF (Annihilating filter) method.

14. The method according to claim 11,
wherein the reflected wave is received by an antenna comprising a single receive antenna.

15. The method according to claim 11,
wherein a single antenna transmits the transmission wave and receives the reflected wave, and
wherein the method further comprises separating a signal related to the transmission wave from the signal related to the reflected wave.

16. The method according to claim 11, the method further comprising transmitting, as the transmission wave, the electromagnetic-wave beam including the first chirp signal and the second chirp signal whose frequencies change proportionally.

17. The method according to claim 11, the method further comprising transmitting, as the transmission wave, the electromagnetic-wave beam including the first chirp signal and the second chirp signal whose time widths are equal to each other.

18. The method according to claim 12, the method further comprising transmitting, as the transmission wave, the electromagnetic-wave beam including the first chirp signal and the second chirp signal whose frequencies change proportionally.

19. The method according to claim 12, the method further comprising transmitting, as the transmission wave, the electromagnetic-wave beam including the first chirp signal and the second chirp signal whose time widths are equal to each other.

20. The method according to claim 13, the method further comprising transmitting, as the transmission wave, the electromagnetic-wave beam including the first chirp signal and the second chirp signal whose frequencies change proportionally.

* * * * *